(12) United States Patent
Nitschmann et al.

(10) Patent No.: US 8,122,728 B2
(45) Date of Patent: Feb. 28, 2012

(54) HEAT PUMP SYSTEM, IN PARTICULAR FOR A HOUSEHOLD APPLIANCE

(75) Inventors: Kai Nitschmann, Neuenhagen (DE); Günter Steffens, Dallgow-Döberitz (DE); Andreas Stolze, Falkensee (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 818 days.

(21) Appl. No.: 12/087,170

(22) PCT Filed: Dec. 1, 2006

(86) PCT No.: PCT/EP2006/069221
§ 371 (c)(1),
(2), (4) Date: Oct. 2, 2008

(87) PCT Pub. No.: WO2007/077069
PCT Pub. Date: Jul. 12, 2007

(65) Prior Publication Data
US 2009/0094990 A1  Apr. 16, 2009

(30) Foreign Application Priority Data
Dec. 28, 2005 (DE) .................. 10 2005 062 804

(51) Int. Cl.
*F25B 21/02* (2006.01)
(52) U.S. Cl. ......................... 62/3.3; 62/3.7
(58) Field of Classification Search .......... 62/3.2, 62/3.3, 3.6, 3.7, 434
See application file for complete search history.

(56) References Cited

U.S. PATENT DOCUMENTS

| 2,932,753 | A | 4/1960 | Arnott et al. |
| 3,036,383 | A | 5/1962 | Edwards |
| 3,111,166 | A | 11/1963 | Munz et al. |
| 3,231,714 | A | 1/1966 | Oram et al. |
| 4,107,934 | A | 8/1978 | Beitner |
| 5,690,849 | A * | 11/1997 | DeVilbiss et al. ............ 219/497 |
| 6,458,319 | B1 * | 10/2002 | Caillat et al. ................. 420/576 |
| 2002/0162338 | A1 * | 11/2002 | Shimada et al. ................. 62/3.7 |
| 2006/0090787 | A1 * | 5/2006 | Onvural ....................... 136/212 |
| 2007/0089763 | A1 | 4/2007 | Paintner |

FOREIGN PATENT DOCUMENTS

| DE | 1 167 571 | 4/1964 |
| DE | 1 190 961 | 4/1965 |
| DE | 1 410 206 | 10/1968 |
| DE | 6926182 U | 12/1969 |
| DE | 1 763 043 | 5/1971 |
| DE | 1 817 058 | 5/1971 |

(Continued)

OTHER PUBLICATIONS

Abstract of JP 2-195123 to Morishita et al.*

(Continued)

*Primary Examiner* — Mohammad Ali
(74) *Attorney, Agent, or Firm* — James E. Howard; Andre Pallapies

(57) ABSTRACT

A heat pump system including a heat pump having at least two Peltier elements arranged in series and connected to an energy supply, the heat pump system comprising an electrical dropping resistor arranged in series with the Peltier elements, wherein the Peltier elements and the dropping resistor are jointly supplied with energy by the energy supply. The heat pump system is preferably used in a household appliance, in particular a tumble drier.

12 Claims, 2 Drawing Sheets

FOREIGN PATENT DOCUMENTS

Figure 1:
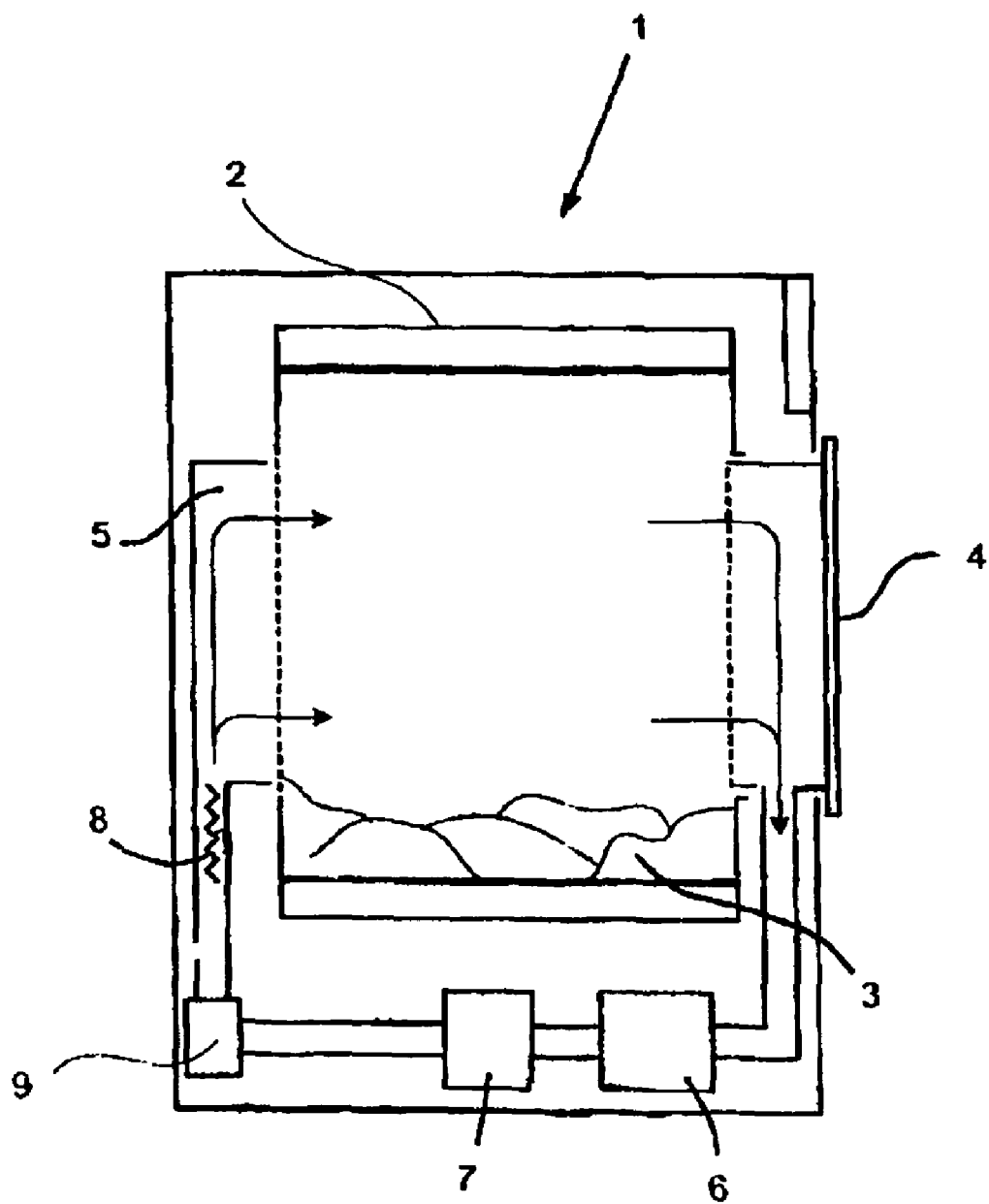

| | | |
|---|---|---|
| DE | 74 10 935 U | 12/1976 |
| DE | 26 39 999 | 3/1978 |
| DE | 30 19 092 | 11/1981 |
| DE | 41 01 644 | 7/1992 |
| DE | 42 33 172 | 4/1993 |
| DE | 195 10 895 | 9/1996 |
| DE | 201 01 641 U | 6/2002 |
| FR | 1.262.399 | 5/1961 |
| FR | 1.595.248 | 6/1970 |
| FR | 2 587 097 | 3/1987 |
| JP | 61-170813 | 8/1986 |
| JP | 2-109977 | 4/1990 |
| JP | 2-195123 | 8/1990 |
| JP | 3-169319 | 7/1991 |
| JP | 8-57194 | 3/1996 |

OTHER PUBLICATIONS

Translation of DE 26 39 999 to Hans Joachim Weiss.*
Article entitled: Quick-Cool Peltier Elements which was downloadable on Nov. 25, 2005 from the internet address http:///www.quick-ohm.de/waerme/download/Erlaeuterung-zu-Peltierelementen/pdf.
Article entitled: Installation of Modules which was downloadable on Nov. 25, 2005 from the internet address http://www.quick-ohm.de/waerme/download/Einbau.pdf.
International Search Report PCT/EP2006/069221.

* cited by examiner $$U_{Ges} = U_1 + U_2 + U_3 + \ldots + U_n$$

HEAT PUMP SYSTEM, IN PARTICULAR FOR A HOUSEHOLD APPLIANCE

The invention relates to a heat pump system with at least two Peltier elements which are switched in series and connected to a voltage supply.

A heat pump system is known from DE 41 01 644 A1. This heat pump system consists of a number of Peltier elements and a voltage supply assigned to said elements, as well as a device for delivering a medium to be cooled down to a cold side of the Peltier element and a device for removing a heated-up medium on the hot side of the Peltier element. The Peltier elements are arranged switched in series and divided up into groups such that these groups are for their part switched in series to allow individual electrical and thermal control.

The layout and function of a Peltier element is known from a document which was able to be downloaded on 25 Nov. 2005 from the Internet address http://de.wikipedia.org/wiki/Peltier element, with said element having the layout described here. The half elements of this Peltier element are embodied in the shape of pillars or square columns and consist of doped semiconductor chips as materials. The semiconductors are especially Bismuth-telluride, and a variably-doped and n-conducting-doped semiconductor are used. A half-element made from the p-conducting doped semiconductor and a half element made from the n-conducting doped semiconductor are respectively connected to each other on one side via a small circuit board, also referred to as a metal bridge, and on another side, which lies opposite the said side, via a further small circuit board to a further half element or a connecting contact for connecting the Peltier element to an electrical network.

Further information (in German) about basic principles, application-related selection and installation of Peltier elements can be found in the documents entitled Quick-Cool Peltier Elements and Installation of Modules dated Nov. 25, 2005.

A washing machine is disclosed in DE 1 410 206 A in which washing cannot just be washed but can also be dried. The document describes a number of alternatives for the additional devices required; in particular an electrical heating device for heating up a stream of air used for drying washing and a simple heat exchanger for cooling down the heated air stream after it has been applied to the washing can be provided, the heater and the cooler can however also belong to a heat pump device. The heat pump system can operate with Peltier elements for utilizing the thermoelectric effect.

A device taken from a collection of data entitled "Patent Abstracts of Japan" in an abstract belonging to JP 08 057 194 A for drying washing contains, in a conduit system, as well as a heater and a cooler, which both belong to the thermoelectrically-operable heat pump system, an additional heat exchanger connected upstream from the heat pump for cooling down the stream of air discharged from the washing and an additional heating device downstream from the heater for further heating of the stream of air before it is applied to the washing.

For any known domestic appliance use of such a heat pump system is still relatively cost intensive, since a higher energy consumption is required for the operation of the heat pump system.

The object of the invention is thus to create a generic heat pump system which has a reduced energy consumption.

This object is achieved by a heat pump system which has the features claimed in claim 1.

The inventive heat pump comprises a heat pump with at least two Peltier elements which are switched in a series circuit. The Peltier elements are connected to an energy supply, especially a voltage supply. An electrical dropping resistor is connected in series to the Peltier elements and likewise connected to the energy supply, with the Peltier elements and dropping resistor being jointly supplied with energy by the energy supply. This enables a heat pump system to be provided which, because of the circuit concepts employed, has a greatly reduced energy consumption.

Preferably the dropping resistor is designed such that the total of the individual voltage drops at the dropping resistor and the Peltier elements is essentially equal to the voltage of the energy supply. Preferably a rectified and preferably smoothed ac voltage is able to be provided by the energy supply.

Preferably a rectifier circuit, especially a bridge rectifier circuit, is connected downstream from the dropping resistor. Alternatively the dropping resistor is connected downstream from the rectifier circuit. In the latter case a more simple rectifier circuit can be used, which enables cost savings to be achieved.

The rectifier circuit is preferably embodied as a bridge rectifier circuit, especially as a Graetz bridge. This embodiment with the downstream dropping resistor means that there is already a voltage drop at this dropping resistor and thus a reduction of the electrical voltage present before the rectifier circuit.

In a preferred manner the heat pump is arranged in an open or closed process air conduit of a domestic appliance for care of washed items, especially of a tumble dryer. A domestic appliance is provided for the care of washed articles which features a thermoelectric heat pump and in which a drying process can be carried out with reduced energy consumption and thereby also at lower cost. With a closed process air conduit a process air circuit can be provided and thus a recirculating dryer implemented.

Preferably the dropping resistor in the process air circuit is arranged downstream from the Peltier elements. This means that in the direction of flow of process air, the dropping resistor is arranged after the Peltier module.

Preferably the dropping resistor is arranged so that process air flowing in the process air conduit is able to be heated up by heat generated in the dropping resistor. The energy emitted by the dropping resistor is thus used for heating up the process air. This corresponds to a direct coupling-in of the electrical power dissipation of the dropping resistor into the process air.

Preferably there is additional provision for a heating device to be arranged in the process air conduit and for the dropping resistor to be at least one heating coil of the heating device. This allows a technically very effective concept in respect of energy minimization of the heat pump system to be achieved. In addition a component already present in the form of a heating coil of the heating device can be used as a dropping resistor. A concept employing few components is thus made possible.

A reduction of the costs for a drying process in such a domestic appliance is preferably achieved by this heat pump system being embodied with a greatly reduced number of Peltier elements between a normal heat exchanger and the heating device, which is if necessary operated with a greatly reduced heat output. A corresponding "small" heat pump system especially features ten Peltier elements, whereas a "normal" heat pump system comprises around 30 Peltier elements. In an embodiment as a "small" heat pump system an overall voltage drop across the Peltier elements is especially smaller than an applied rectified ac mains voltage, which however makes an adapted, especially electronic, power supply of the Peltier elements necessary.

Figure 2:
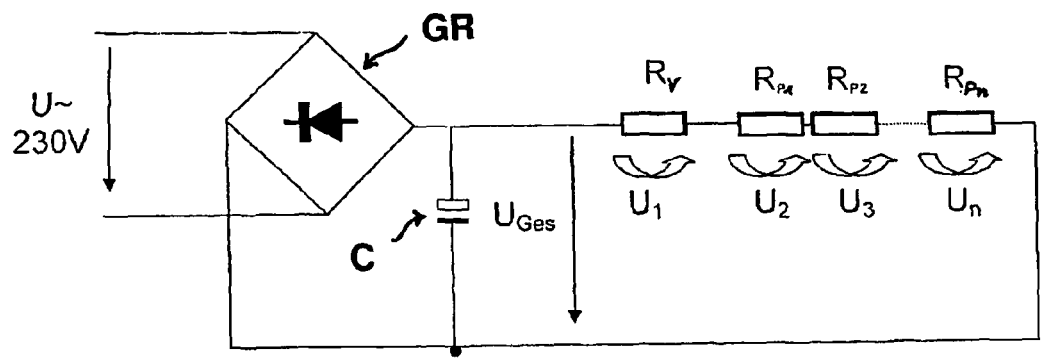
Figure 3:
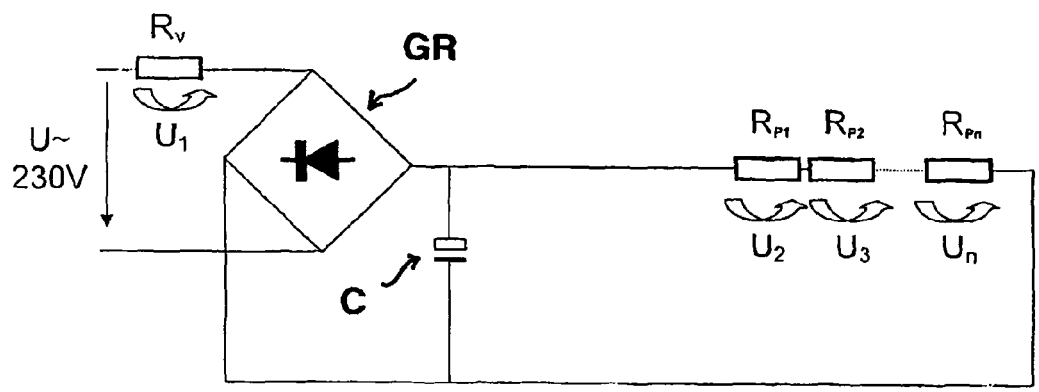

Exemplary embodiments of the invention are explained in greater detail below with reference to the schematic drawing. The drawing shows the following:

FIG. 1 a cross-sectional view of a tumble dryer with a heat pump system;

FIG. 2 an electronic circuit arrangement of the heat pump system as claimed in a first version; and FIG. 3 an electronic circuit arrangement of the heat pump system as claimed in a second version.

In the figures the same elements or those with the same function have been labeled with the same reference symbols.

FIG. 1 shows a schematic of a cross-sectional view of a domestic appliance 1 for care of washed items which is embodied in the exemplary embodiment as a tumble dryer 1. This tumble dryer 1 is embodied according to the recirculating principle and includes a container 2 receiving the washed items 3, which is supported in the inside of the tumble dryer 1 so that it is able to rotate around a horizontal axis of rotation not shown in the figure. The container, referred to as the drum 2 below, has a loading opening 4 shown in the drawing on the front right-hand side, to enable textiles or washed items 3 to be loaded into the drum 2 for drying. Embodied on the rear of the drum is a plurality of openings (not shown), through which drying process air can flow, as indicated by arrows.

As can be seen from the diagram in FIG. 1, the tumble dryer 1 features a process air circuit 5, in which the drum 2 is arranged. The process air directed through the drum 2 in the direction shown by the arrows is guided within the circuit, with the process air being heated up before entry into the drum 2 and cooled off after exit from the drum 2 for condensing moisture contained in the process air. To this end the tumble dryer 1 features a first heat exchanger 6 which is embodied for condensing the air laden with moisture. This heat exchanger 6 thus allows air exiting the drum 2 to be dehumidified. The tumble dryer 1 also has heat pump 7, likewise arranged in the process air circuit 5, which features a plurality of Peltier elements 11 (see FIGS. 2 and 3). The Peltier elements 11 are switched in series and able to be supplied with energy by an ac voltage. The ac voltage is rectified and smoothed in the exemplary embodiment.

The heat pump 7 is embodied as a duplicated heat exchanger 7. By supplying the Peltier elements 11 with electrical energy a cold side and a warm side are created, which are arranged such that the process air flowing through the heat pump 7 first reaches the cold side, where it is further cooled and dehumidified, and secondly reaches the warm side, where it is heated up again.

A further heating up of the process air is achieved by a heating device 8 which is arranged in the exemplary embodiment adjacent to the entry of the process air in the drum 2 in the process air circuit 5. The direction of flow of the process air is created by the fan 9 which is connected upstream from the heating device 8 in the direction of flow.

Within the drum 2 the heated process air comes into contact with the items of washing 3 to be dried and takes up moisture in doing so.

The outflowing process air leaves the drum 2 through an opening adjacent to the loading opening 4 and subsequently flows out through openings which are embodied on the rear of the loading door 4 facing towards the inside of the drum 2. At least one lint filter (not shown) can be arranged in the flow channel between the loading door 4 and the first heat exchanger 6.

The heating device 8 contains an electrical dropping resistor 8 connected in series with the Peltier elements 11 of the heat pump 7, see also FIGS. 2 and 3. The electrical dropping resistor 8 is likewise connected to the rectified and smoothed ac voltage. As can be seen in FIG. 1 the electrical dropping resistor 8 only shown symbolically is arranged or connected in the process air circuit 5 in the direction of flow of the process air downstream from the heat pump 7 and thereby also of the Peltier elements 11. The heat generated in the electrical dropping resistor 8 is used for additional heating up of the process air flowing past it.

In the exemplary embodiment the electrical dropping resistor 8 is embodied as a heating coil in the heating device 8, which, in accordance with requirements, contains a number of further heating coils (not shown).

FIG. 2 shows a first embodiment of an energy supply 10 of the heat pump system. The Peltier elements 11 are connected in series and characterized by resistors $R_{p1}$ to $R_{pn}$. Voltages $U_2$ to $U_{n+1}$ drop at these resistors $R_{p1}$ to $R_{pn}$. In addition an electrical dropping resistor 8 with the value $R_v$ (see FIG. 1) is switched in series with these resistors $R_{p1}$ to $R_{pn}$ and thus in series with the Peltier elements 11. A voltage $U_1$ drops via the electrical dropping resistor $R_v$. As can further be seen from the diagram shown in FIG. 2 an ac voltage is provided in the energy supply 10 to the heat pump 7 as an alternating current and is rectified by a bridge rectifier circuit GR. The rectified mains voltage is smoothed by the capacitor C. The dropping resistor $R_v$ is designed so that the total of the individual voltage drops $U_1$ to $U_{n+1}$ is essentially equal to the rectified and smoothed mains voltage $U_{ges}$. In this version shown in FIG. 2 the electrical dropping resistor $R_v$ is connected downstream from the bridge rectifier circuit GR.

FIG. 2 shows a further embodiment of the energy supply 10 in which the electrical dropping resistor 8 or $R_v$ is connected before the bridge rectifier circuit GR. This means that even before the bridge rectifier circuit GR a voltage drop can be created at this electrical dropping resistor 8 or $R_v$ and thus the voltage can be divided up even before the bridge rectifier circuit GR. In this arrangement the bridge rectifier circuit GR embodied as a Graetz bridge can be embodied cost-effectively. In addition a cost-effective capacitor C can also be used with this version.

The circuit diagrams shown in FIGS. 2 and 3 illustrate two different energy supplies 10 and electrical wiring of the Peltier elements 11 with the electrical dropping resistor 8 of the heat pump system. These should not however be taken as definitive and in addition only feature the components which are of significance for the present explanation. The energy supplies 10 can thus be expanded or modified without departing from the essential ideas behind the proposed heat pump system.

The invention claimed is:

1. A heat pump system including a heat pump having at least two Peltier elements arranged in series and operatively connected to an energy supply, wherein at least one Peltier element is used for heating, the heat pump system comprising an electrical dropping resistor for supplemental heating arranged in series with the Peltier elements, wherein the Peltier elements and the dropping resistor are jointly supplied with energy by the energy supply.

2. The heat pump system according to claim 1 wherein the dropping resistor is configured so that the sum of the individual voltage drops at the dropping resistor and the Peltier elements is essentially equal to the voltage of the energy supply.

3. The heat pump system according to claim 1 and further comprising means for rectifying and smoothing ac voltage from the energy supply.

4. The heat pump system according to claim 1 wherein the dropping resistor is connected downstream from a rectifier circuit.

5. The heat pump system according to claim 1 wherein the dropping resistor is connected downstream from a bridge rectifier circuit.

6. The heat pump system according to claim 1 wherein the dropping resistor is connected upstream from a rectifier circuit.

7. The heat pump system according to claim 1 wherein the dropping resistor is connected upstream from a bridge rectifier circuit.

8. A heat pump system including a heat pump having at least two Peltier elements arranged in series and operatively connected to an energy supply, the heat pump system comprising an electrical dropping resistor arranged in series with the Peltier elements, wherein the Peltier elements and the dropping resistor are jointly supplied with energy by the energy supply and wherein the heat pump is operationally disposed in a process air conduit circuit of a domestic appliance for care of washed items, especially of a tumble dryer.

9. The heat pump system according to claim 8 wherein the dropping resistor is operationally disposed in the process air conduit downstream of the heat pump.

10. The heat pump system according to claim 8 wherein process air flowing in the process air conduit is heated by heat generated by the dropping resistor.

11. The heat pump system according to 8 and further comprising a heating device operatively disposed in the process air conduit and the dropping resistor is a heating coil of the heating device.

12. The heat pump system according to claim 11 wherein the heat pump is operatively disposed between a heat exchanger for cooling the process air and the heating device.

* * * * *